Dec. 7, 1965  W. R. McKELVY  3,222,237
METHOD OF MANUFACTURING REINFORCED PLASTIC SHEET
Filed March 30, 1962  2 Sheets-Sheet 1
FIG.1
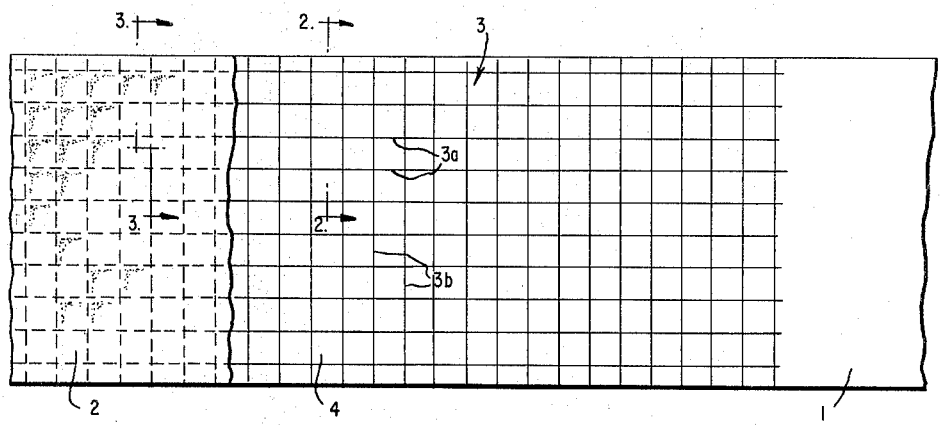
FIG.2
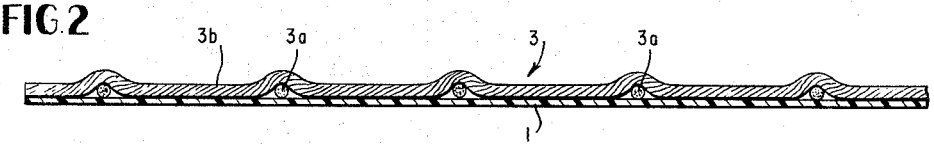
FIG.3
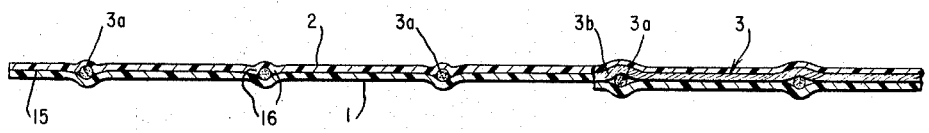
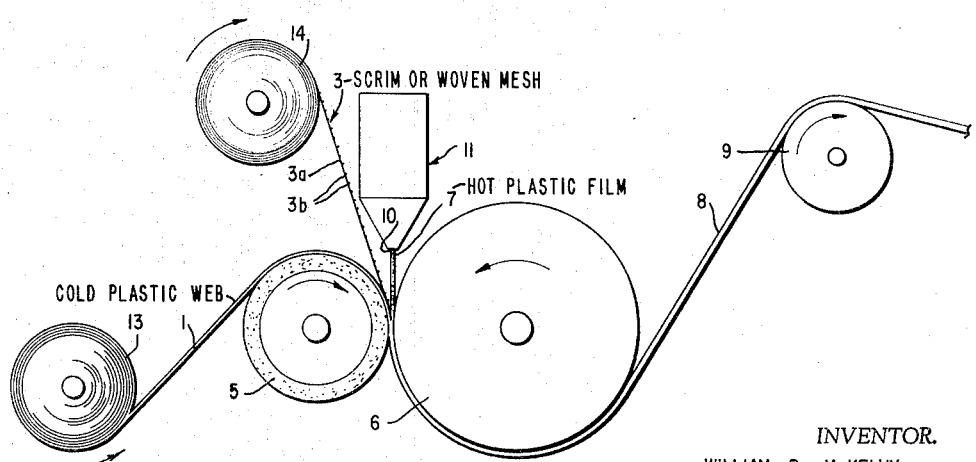
FIG.4
INVENTOR.
WILLIAM R. McKELVY
BY
Mead, Browne, Schuyler & Beveridge
ATTORNEYS Dec. 7, 1965   W. R. McKELVY   3,222,237
METHOD OF MANUFACTURING REINFORCED PLASTIC SHEET
Filed March 30, 1962   2 Sheets-Sheet 2

INVENTOR.
WILLIAM R. McKELVY
BY
*Mead, Browne, Schuyler & Beveridge*
ATTORNEYS

United States Patent Office 3,222,237
Patented Dec. 7, 1965

3,222,237
METHOD OF MANUFACTURING REINFORCED PLASTIC SHEET
William R. McKelvy, Atlanta, Ga., assignor to Lamex, Inc., Norcross, Ga., a corporation of Georgia
Filed Mar. 30, 1962, Ser. No. 183,776
4 Claims. (Cl. 156—177)

This is a continuation-in-part of application Serial No. 684,788 filed September 18, 1957, now abandoned.

This invention relates to reinforced plastic sheet material and to a method of forming a unitary plastic sheet having centrally imbedded therein a reinforcing mesh. It relates more particularly to fusion imbedding of a coarse mesh within a thin polyethylene film wherein the outer surfaces of a plastic film are solidified before and during the process of fusion of the inner surfaces and supplies explanation of certain process details discernible from the product of the process of application Serial No. 684,788, at the same time omitting any limitation to structure of the reinforcing net material.

It is an object of the invention to produce a superior product in the form of tear resistant sheet of deformable plastic supported by non-deformable fibrous netting centrally fused therein.

Another object of the invention is to provide a method of manufacture of a homogeneous sheet having imbedded centrally therein a reinforcing mesh formed in a continuous high speed process.

A still further object of the invention is to provide a method for continuously forming from a single plastic material and a fibrous mesh a fusion imbedded reinforcement.

Briefly described, a reinforced flexible plastic sheet material according to the present invention is one in which a network or grid of glass fibers or threads is enclosed centrally within a film of polyethylene or the like, by a fusion process in which the plastic film web between the strands of the mesh has a thickness a fraction of that of the fibers themselves. Employing this method of manufacture a scrim of glass fibers, a netting of nylon, rayon, or of other form of reinforcing mesh of fibrous material may be imbedded within thin films of plastic material to impart its strength thereto leaving substantially half of the film thickness exteriorly of the fibers of the mesh.

One preferred method of making such reinforced plastic sheet material comprises superposing a non-woven network of glass scrim on a preformed polyethylene web or sheet, fusing a film of substantially molten polyethylene on the opposite side of the network from the film, cooling the outer face of the molten film of polyethylene, pressure spreading the still molten center portion of the polyethylene along the surface of the film between the meshes to cause interfusion therewith, and further cooling the molten material until a solid film is formed almost entirely about the reinforcing mesh, after which the film is stripped from the cooling roll.

This process of forming a virtually solid sheet of polyethylene film with netting arranged approximately centrally therein may be varied considerably, principally by varying the thickness of the fluid film employed and the temperature of the cold roll. The resulting product differs in accordance with these variants and can be given an approximately smooth surface on one side, whereas the opposite side of the composite film contains the raised portions corresponding to the thickness of the longitudinal and transverse reinforcing fibers, exhibiting a netted appearance on the cold film side with raised knobs at the intersection points of the longitudinal and transverse fibers.

This process differs from prior processes most importantly in the manner of imbedding netting in the centrally hot fluid sheet while applying forming pressure through cooled solid surfaces. While it is conventional to employ two sheets sandwiched together with a reinforcing material therebetween by means of one or two heated rollers such a process results in a severe thinning of the enclosing film, particularly at the area requiring the greatest strength, which is that area outside of the strands. Whenever heat is applied by means of a heated roller the surface components of the heated film are most strongly heated and hence are weakened to the greatest degree. These are also the areas of highest extruding pressure.

The result experienced is that the reinforcing fibers, when of substantial diameter are caused to emerge or nearly emerge from the surface of the heated film adjacent the heated roll.

In accordance with the process of the parent case, here carried forward, these difficulties have been avoided by two principal features of the process here employed. Essentially all of the curvature of the finished film, as it extends to include the surrounded netting material, occurs in the cool and solid film 1. Film 1 is passed across the resilient roll 5 in the unheated condition in which it possesses virtually no thermoplastic characteristics under the pressures employed except at the contact areas with the heated film. Therefore the exposed ridges of film 1 as they overlie the finished netting material are essentially undiminished in strength and thickness, and are able to withstand rough usage with no danger of the threads or strands pulling out through this film. It is obvious that if the roll 5 were heated this result could not be obtained.

The hated film 7, as it comes into contact with the netting and the film 1 is in highly fluid condition. At such temperatures the molecular arrangement is not yet fixed and the solid characteristics of polyethylene film have not developed. Material in such a fluid condition can be pressed into the interstices of the strands of the netting and, to some degree, in the surface fibers of the strands.

Other objects and advantages of the invention will become more apparent from the following detailed description taken in conjunction with the attached drawings in which:

FIG. 1 is a plan view of reinforced plastic sheet material according to the present invention including a broken away portion showing the general relation of the base sheet and the reinforcing network during a middle stage or step of the process;

FIG. 2 is an enlarged sectional view taken along line 2—2 of FIG. 1;

FIG. 3 is a further enlarged sectional view taken along line 3—3 of FIG. 1, illustrating a novel form of the product of this process;

FIG. 4 is a diagram illustrating steps in the process of making the product;

Figure 5:
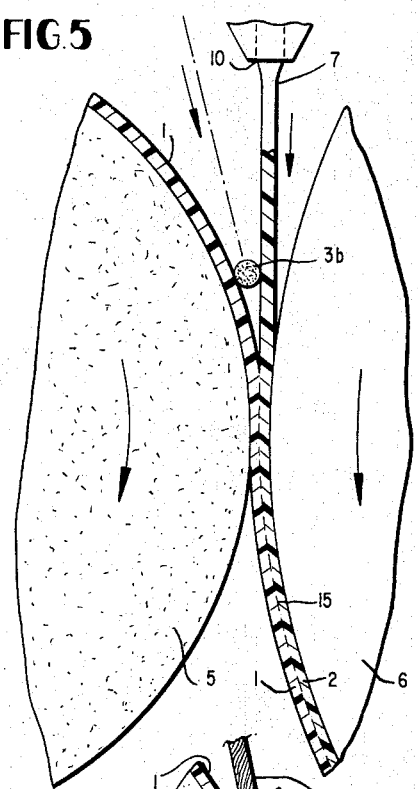
FIG. 5 is an enlarged view as in FIG. 4 showing a strand of mesh about to be imbedded or surrounded by fluid film.

Referring to FIG. 1, the reference numerals 1 and 2 indicate, respectively, two sheets of plastic material formed about a reinforcing mesh. Polyethylene is a preferred material for sheets 1 and 2 hereinafter referred to, although it is to be understood that other plastic material having thermoplastic properties generally equivalent to polyethylene may be used. A reinforcing network or grid of fibers, indicated generally by the reference numeral 3, is included within and partially between sheets 1 and 2. Network 3 may be either a leno weave or a non-woven open mesh network of glass fibers or strands sometimes referred to as glass scrim. As such, it may be composed of a plurality of longitudinally extending spaced apart threads 3a crossed by spaced apart threads 3b which preferably extend transversely with respect to threads 3a so as to define a plurality of mesh or grid openings 4. While the shape of openings 4 may be chosen as desired, a preferred shape is a generally square opening as shown in FIG. 1, wherein each side of the square is approximately one-quarter to one-half inch in length.

The process employed in the manufacture of such a sheet has been found equally successful in the manufacture of plastic sheet material reinforced by materials other than glass fibers in the form of scrim or leno weave netting, or of other mesh material which has a strand diameter small with respect to the spaces between the strands, whether the mesh is of square, rectangular, hexagonal, or other form. In a product which requires a large degree of flexure, often repeated, the loosely arranged unwoven glass scrim enclosed in a plastic by this method retains the high degree of flexibility and very high tensile strength, for the reason that the individual fibers of the glass are not individually imbedded in the plastic as a composite strand of fragile nature. Where a higher degree of flexure may be required such as to make impracticable the use of glass fibers, material such as nylon mesh, acetate mesh, rayon mesh, and other fibrous netting materials may be successfully substituted. Polyethylene is used herein as an exemplary material for the reason that it preserves its flexibility at low temperatures even under a considerable range of stress to the finished sheet, and more particularly for the reason that it has a high degree of extensibility before rupture so as to limit tearing, cracking or extension of holes accidentally introduced therein. These desirable characteristics are accompanied, however, by the undesirable characteristic of lack of strength and of permanent extensibility over much too wide a range for many uses of such sheet material. This extensibility is controlled by the use of fibrous netting of a type wherein low extensibility is combined with high tensile strength and flexibility.

Polyethylene sheets 1 and 2 are pressure-fused directly to each other to form a unitary sheet substantially entirely throughout each opening 4 so that the reinforcing network 3 is not only embedded within, or covered by, the polyethylene sheet but, in addition, the substantially complete fusion between the two inner film surfaces retains the reinforcing network securely in place. When the reinforcing network is composed of glass fibers or threads, it is found that there is not a complete bond between the glass fibers and the polyethylene while the polyethylene is joined into one sheet as a consequence of the fusion of surface portions of sheet 1 as molten polyethylene touches it in the nip of the rollers, as will be hereinafter described. Because of the method of formation of the polyethylene sheet which includes "casting" of a semi-liquid upon a solid base followed by partial cooling at both surfaces of the molten material, and pressure-roller spreading of any semi-molten material, not yet solidified, there will of necessity be some degree of penetration of the molten material into the outer layer of fibers of the mesh material. The fibers of the mesh are thus effectively kept in place and the fused bond between the surfaces of the plastic sheet produces a unitary sheet between the strands.

FIG. 2 illustrates a mesh laid on a cool solid film 1 at an early stage or step in the forming of the composite reinforced sheet.

Figure 6:
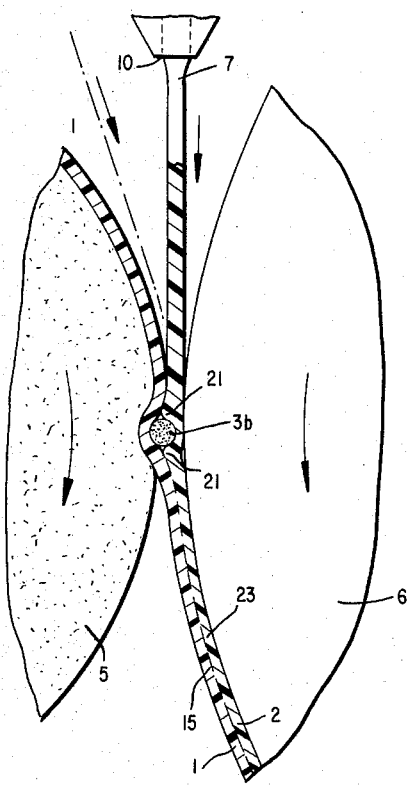
FIGS. 6 and 7 are enlarged views as in FIG. 5 showing the imbedding of a mesh intersection and the resultant form of the cooled film as it is removed from the forming rolls.
Figure 7:
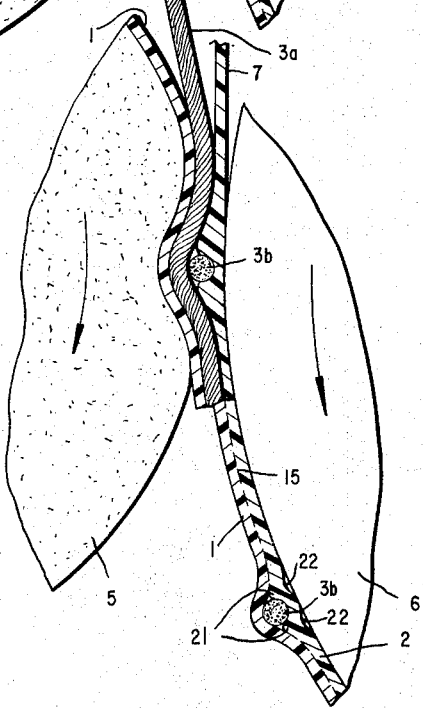

As illustrated in FIGS. 2 and 3 the sheet comprises three portions indicated as web or film 1 of preformed solid sheeting in thicknesses such as .001, .002 or .004 inch in accordance with the weight of material desired as a product, a fibrous mesh material 3a and 3b adjacent to the film 1, and covering film 2 enclosing the mesh on the opposite side thereof. FIGS. 3, 6 and 7 indicate the shape of finished sheet, as seen in section, which results from the casting of the film 2 upon base 1 overlain by netting 3a and 3b while cooling the film 2 at the surface thereof in contact with the cooled rigid roll 6. The high degree of curvature about the reinforcing strands results from the use of a pressure roll 5 of resilient form on the cold film face of the sheet as it passes through the nip of the rolls, as more completely described hereinafter.

FIG. 4 shows steps in a preferred process for making the reinforced plastic sheet material shown. As an initial step in this process, polyethylene sheet 1 is fed, as a preformed polyethylene web, to a pair of pressure rolls 5 and 6. Simultaneously, a glass scrim 3 is laid on top of polyethylene sheet 1 so as to be on sheet 1 before the latter enters the nip between rolls 5 and 6. Shortly prior to the time that sheet 1 and scrim 3 enter the nip between the rolls 5 and 6, molten polyethylene 7 in sheet or film form is fed onto roll 5 above the junction between the rolls above the line of maximum pressure in the nip, so that the molten polyethylene overlies the reinforcing glass scrim 3.

Sheet 1, scrim 3, and molten polyethylene 7 then all pass between pressure rolls 5 and 6 and the latter press these components together with sufficient pressure to cause the molten polyethylene 7 to be fused directly to the polyethylene sheet 1 substantially entirely throughout each opening 4 of the fiber network or scrim 3.

While pressure is being applied to the partially hardened polyethylene, it is further cooled by pressure roll 6 so that, in addition to becoming bonded to polyethylene sheet 1, the molten polyethylene becomes further hardened to become polyethylene sheet 2. The reinforced plastic sheet material made up of the fused-together polyethylene sheets containing the reinforcing net is indicated generally by the reference numeral 8 and is shown as being led from cooled pressure roll 6 over an idler roll 9, as a finished product. Material 8 may be wound up on a roll-up winder or the like, not shown.

The gauge, or the thickness, of the composite sheet material 8 depends upon the end use of the sheet material. However, merely by way of example, the gauge may be approximately eight mils. The thickness as illustrated is considerably greater merely as a means of illustrating more clearly what occurs in the process. Preformed sheet 1, which may be referred to as the base sheet, may be of heavier or lighter gauge than sheet 2. When the gauge of composite sheet 8 is approximately eight mils, each of the longitudinally and transversely extending threads or fibers 3a and 3b of glass scrim may have a diameter of approximately five and one-half mils. As indicated above, a mesh opening 4 in the neighborhood of one-quarter to one-half inch on the side may be utilized.

Pressure roll 5 has a resilient surface and is preferably made of rubber, e.g. foamed rubber. Pressure roll 6 is made of steel or other suitable metal and is chilled by suitable means, not shown. Roll 5 has a diameter of approximately twelve inches while roll 6 has a diameter of approximately eighteen inches. Each roll has a length predetermined according to the desired width of the finished product. Roll 5 is biased against roll 6 with sufficient pressure to cause the solid sheet of polyethylene film to be forced against the already surface-hardened sheet 7 on pressure roll 6 during the hardening of the center portion of the film, after which it may be stripped from roll 6. By way of example, rolls 5 and 6 may exert a nip pressure in the neighborhood of thirty to sixty pounds per lineal inch on the material passing between the rolls without extruding or squeezing out the freshly hardened film 7 from between roll 6 and the mesh fibers.

The substantially molten polyethylene is "poured" or "extruded" in sheet or laminar form from an orifice 10 of a suitable linear nozzle or die, indicated generally by the reference numeral 11. As it leaves the orifice, the polyethylene is at a temperature in the range from 400°–500° F., and is therefore more fluid than solid but has a degree of tensile strength sufficient to maintain a uniform surface in the absence of forming pressure. Extruder head 11 has an orifice 10 in the form of a slit of controlled width extending along the length of roll 6 and close to the surface thereof. To minimize heat loss after extrusion, orifice 10 is immediately above a point on roll 6 at which film 1 and the mesh 3 lying thereon is introduced. It was found that contact of the film 7 with roll 6 for a short distance, such as a quarter inch, in advance of the application of pressure was sufficient to produce surface congealing or hardening of the film 7 adjacent to the roll 6 so that pressure from the roll 5 is ineffective to cause cutting through of the film 7 by the strands 3 under maximum pressure. The illustration in FIG. 4 is schematic and the nozzle 11 would normally be placed very near the point of contact of film 7 with roll 6 for better control of film temperature.

It will thus be seen that the present invention provides a method of producing an extremely flexible plastic sheet material which nevertheless possesses substantial tensile strength due to the reinforcing network or scrim which is incorporated therein. Furthermore, by employing polyethylene, or a material having tensile and thermoplastic properties generally equivalent to polyethylene, as the plastic sheet material, and pressure-casting a laminar polyethylene directly to the preformed polyethylene sheet substantially entirely throughout each mesh opening, both sheets being of the same material, it is unnecessary to coat or otherwise treat the scrim or to employ a solvent or plasticizer to provide a firm bond between the reinforcing material and the plastic material. It is also unnecessary to employ an adhesive, solvent, plasticizer or the like in order to bond the polyethylene sheets to each other, since they are pressure-fused at the junction of hot film 7 with film 1, the surface of film 7 at that time being already hardened on roll 6. The reinforcing material is economical in the sense that it may be a non-woven network or scrim of glass fibers or a woven netting of inexpensive synthetic material such as rayon, and the like, having strength and freedom from extensibility.

FIGS. 5, 6 and 7 illustrate details of this forming process which result in high strength material from which the reinforcing strands cannot be torn even by rough use. Attention is directed to the steps performed before, in, and after passing the nip. It will be seen that the relatively soft material 5 will be depressed at the nip between the rolls inasmuch as an undeflected surface of 5 would intersect the surface of roll 6 when under pressure. Threads 3a of the net cause a considerable thickening of that portion of the composite sheet. The rigid roll 6 is not deformable and the surface of the material 7 is therefore given a nearly straight or planar configuration as it is solidified on cooled roll 6. The semi-molten material impinging upon roll 6, upon film 1 and upon the netting strands necessarily heats the adjacent material of film 1 above the pressure fusion point long enough to cause a degree of inter-melting at the contact between the materials 1 and 7. Heating of the film material 1 substantially softens the entire thickness thereof during the interval of time in which the resilient roll 5 is exerting pressure against the roll 6. It will also be apparent that portions of the film 1 adjacent to the fiber material 3a and 3b will not be heated to the pressure-fusion point and will thus be able to withstand the pressure between the forming rolls to thereby retain full thickness of film 1 adjacent thereto. Orifice 10 of the distributing nozzle 11 is arranged preferably in close proximity to the nip of the rolls for the reason that oxidation of the surface portions of a body of molten plastic occurs when long exposed to the air.

It is further to be noted that the hot material contacts cooled roller 6 to become surface hardened prior to the time at which the final film is formed at the maximum pressure line of the two rolls. The extruded or poured sheet of material 7 is thus brought quickly into contact with the cooled roll 6 and thereafter immediately forms a solid material adjacent to the roll 6. The importance of this resides in the necessity to maintain a substantial thickness of film portion exteriorly of the netting strands in order that these strands may not easily be torn from the finished sheet otherwise greatly weakened at those points.

According to this invention, therefore, applicant employs the cooled roller to chill the molten plastic in contrast to prior methods in which one or both of two already solidified sheets are welded together thermoplastically between heated rolls with the result that a maximum flow or extrusion occurs at the point of maximum heating and of maximum pressure, which would obviously be at the strands to cause an extrusion of the film material from the encasing film and exposing the strands to view. Thus, while solid films are uniteable by heated roll pressure-fusion this produces an inferior product when a coarse strand mesh is thereby sandwiched. The incorporation of a mesh requires particular attention to pressure, temperature and a relation between roll speed and film thickness such that the freezing of the film occurs progressively through the hot sheet and is neither too slow nor too fast. The heated material 7 must become solidified adjacent to roll 6 before the pressure is applied, and when the roller is sufficiently cooled this solidified portion is of adequate stiffness to support the pressure in the nip of the rolls and to retain a substantial portion of the material exterior of the strands. Because the process is rapid in a high speed commercial operation the cooling of the molten material 7 adjacent to the surface of the roll 6 does not extend entirely through the laminar sheet and the inner portion remains fluid or semi-molten as it contacts film 1. Film 1 is heated by portions of the molten material 7 adjacent thereto sufficiently at the immediate surface thereof to cause a pressure-fusion bond. It will also be evident that the strands are subjected to the surrounding molten material 7 and will be coated on the adjacent sides with adhering fluid plastic at the outer surface layers thereof.

As a consequence of the cooling of the surface of the molten material adjacent the roller 6 and of the surface adjacent the previously solid material 1 there is quickly formed an encasing shell of solid material between which the residual portion of the liquid plastic 7 is free to move under influence of the pressure between the rolls 5 and 6. It will be understood that speed of rotation of the rolls 5 and 6 may be adjusted to correspond to a desired rate of feeding of the molten material 7. Thus, the relative amounts of the molten material cooled before the maximum pressure is exerted at the nip of the rolls is controllable within considerable limits as may be desired to control the thickness of the resulting film or the degree of penetration of the liquid plastic into the surface layers of the strands. The rate of feed through the nozzle 10 is a further means of control for the thickness of the material to be cast on the side of the composite film adjacent to the roll 6. The degree of solidification of the molten material 7 prior to compression against the surface of the previously solid material 1 is one of the variable factors in the process. A second variable in the process consists in the rate of supply of the molten material 7 and of the solid material 1, a relatively greater amount of molten material generally causing a deeper fusion of the previously solid material 1 because of the relative greater heat content thereof. These factors may of course be controlled as desired by the rate of rotation of the rolls to thus control the supply of solid film 1 and strands 3a and 3b. Likewise the width of the orifice 10 may be controlled for any desired rotation rate of the rolls 5 and 6.

FIGS. 6 and 7 show portions 21 of the sheet 7 forced into the crevice formed as the sheet 1 is curved by roll 5 about a strand at 3b. The completeness of the filling of this crevice is controlled by the temperature and pressure, as well as by the speed of operation of rolls 5 and 6. As the film material 7 is fused to film 1, as at 15, and pressure is reduced as strand 3b emerges from the nip the portion of film 1 near 3b is released from the deforming pressure. Because of the rapid cooling the film 7 is largely cooled before the pressure is entirely removed from film 1. Any tendency of film 1 to return to a straight configuration is resisted by the sudden chilling of the film 7 and the portions 21 which now form a generally prismatic structure supporting films 1 and 7 in nearly fixed relationship. Some drawing in will be observed as at 22, however, when the finished sheet is inspected occurring, principally after roll 5 pressure is removed.

It will now be understood that the finished sheet could be cast of two hot fluid sheets 7 around the fibers of a mesh by the use of two rolls such as 6, except that one must be a resilient surface to accommodate the mesh under pressure, and the use of two rolls such as 5 is unsatisfactory since a flexible roll of foamed plastic or the like would not provide the very rapid cooling needed in a high speed process. Use of one preformed sheet speeds the process and brings added controllability.

Reinformed polyethylene sheet material according to the present invention is normally clear and translucent. However, if desired, it may be colored and made opaque by the use of suitable pigments. A few of the many uses for this sheet material are as a glass substitute for window openings, particularly in greenhouses; as tarpaulin material for covering machinery, etc.; as a ground covering for nurseries, gardens, etc.; and as a barrier material placed under concrete floors.

While I have described and illustrated a preferred embodiment and practice of the present invention, I wish it to be understood that I do not intend to be restricted solely thereto but that I do intend to cover all modifications thereof which would be apparent to one skilled in the art and which come within the sphere and scope of my invention.

What is claimed is:

1. The method of making a reinforced plastic sheet material which comprises the steps of laying a network of reinforcing threads onto a preformed web of plastic material, extruding a semi-molten film of said plastic material onto said web and over said network while cooling a surface of said film sufficiently to form a solid film surface prior to application of laminating pressure, and pressing said web, network and film together to sandwich said network between said web and film on the film side opposite said surface thereby to bond said film to said web substantially entirely throughout each opening of said network.

2. The method of making a reinforced plastic sheet material which comprises the steps of laying a network of glass strands onto a preformed web of polyethylene, extruding a semi-molten film of polyethylene onto said web and over said network, chilling a surface of said film opposite said network to form a solid outer film surface leaving a fluid inner surface adjacent said network, subsequently pressing said web, network and film together sufficiently to bond said film to said web substantially entirely throughout each opening of the network, and further chilling said film from the side opposite said web to progressively harden said film from the cool side toward said web.

3. The method according to claim 2 wherein said semi-molten film of polyethylene is at a temperature in the range from 400–500° F. as it is extruded.

4. A continuous process for forming a sheet of homogeneous plastic material with reinforcing mesh enclosed therein comprising the steps of,
passing a thin sheet of said material in solid form over a resilient pressure roll and through the nip between said roll and a cooperating rigid roll urged thereagainst at a nip line,
passing a mesh of dimensionally stable strands into said nip on the side of said sheet opposite said resilient roll at a feed rate approximating the movement of said sheet,
inserting between said net and said rigid roll a laminar flow of said plastic material in fluid form moving at a rate not exceeding said feed rate and with the flow oriented to contact said rigid roll, said mesh and said sheet ahead of said line,
cooling said rigid roll sufficiently to cause congealing of said flow of plastic immediately adjacent thereto while leaving uncongealed the body of said fluid during its passage across said line of the nip,
urging said rolls together at said nip sufficiently to weld said part to said uncongealed material, and
stripping said sheet of reinforced plastic from said rigid roll after the temperature thereof has decreased sufficiently to provide self-sustaining strength.

References Cited by the Examiner

UNITED STATES PATENTS

| | | | |
|---|---|---|---|
| 2,281,635 | 5/1942 | Strauss | 161—95 X |
| 2,650,184 | 8/1953 | Biefeld | 161—93 |
| 2,713,551 | 7/1955 | Kennedy | 161—78 |
| 2,744,041 | 5/1956 | Balchen | 156—244 X |
| 3,058,863 | 10/1962 | Gaines et al. | 161—94 |

ALEXANDER WYMAN, *Primary Examiner.*

EARL M. BERGERT, *Examiner.*

H. L. GATEWOOD, G. D. MORRIS,
*Assistant Examiners.*